(12) United States Patent
Mao

(10) Patent No.: US 8,282,300 B2
(45) Date of Patent: Oct. 9, 2012

(54) DAMP TELESCOPIC TUBE AND A DAMP WRITING PEN

(76) Inventor: Lianhua Mao, Fujian (CN)

( * ) Notice: Subject to any disclaimer, the term of this patent is extended or adjusted under 35 U.S.C. 154(b) by 27 days.

(21) Appl. No.: 12/518,040

(22) PCT Filed: Feb. 22, 2008

(86) PCT No.: PCT/CN2008/000383
§ 371 (c)(1),
(2), (4) Date: Jun. 5, 2009

(87) PCT Pub. No.: WO2009/024005
PCT Pub. Date: Feb. 26, 2009

(65) Prior Publication Data
US 2010/0316429 A1  Dec. 16, 2010

(30) Foreign Application Priority Data
Aug. 20, 2007  (CN) ...................... 2007 2 0008016 U

(51) Int. Cl.
*B43K 29/00* (2006.01)
*B43K 1/10* (2006.01)
*G06F 3/033* (2006.01)

(52) U.S. Cl. ..................... 401/195; 178/19.01; 345/179; 401/260

(58) Field of Classification Search ................ 345/179, 345/180, 181, 182, 183; 401/195, 258, 259, 401/260; 178/19.01, 19.02, 19.03, 19.04, 178/19.05
See application file for complete search history.

(56) References Cited

U.S. PATENT DOCUMENTS

| | | | | |
|---|---|---|---|---|
| 575,671 | A * | 1/1897 | Watts et al. | 33/485 |
| 659,026 | A * | 10/1900 | Goldsmith | 401/82 |
| 3,709,620 | A * | 1/1973 | Miyamoto | 401/195 |
| D248,863 | S * | 8/1978 | Miyamoto | D19/36 |
| 4,588,319 | A * | 5/1986 | Niemeyer | 401/205 |
| 4,678,356 | A * | 7/1987 | Garland | 401/95 |
| 5,544,967 | A * | 8/1996 | Yao | 401/195 |
| 5,756,941 | A * | 5/1998 | Snell | 178/19.01 |
| 5,889,512 | A * | 3/1999 | Moller et al. | 345/179 |
| 7,431,528 | B2 * | 10/2008 | Liu | 401/258 |
| 7,518,598 | B2 * | 4/2009 | Liu | 345/179 |
| 2003/0184529 | A1 * | 10/2003 | Chien et al. | 345/179 |
| 2007/0020037 | A1 * | 1/2007 | Liu | 401/259 |
| 2007/0075987 | A1 * | 4/2007 | Liu | 345/179 |
| 2008/0170048 | A1 * | 7/2008 | Hua | 345/179 |

FOREIGN PATENT DOCUMENTS

GB 2087801 A * 6/1982

* cited by examiner

*Primary Examiner* — Brian Glessner
*Assistant Examiner* — Joseph J Sadlon

(57) ABSTRACT

A damp telescopic tube and a damp writing pen are disclosed. The damp telescopic tube has at least two metallic tubes in different diameters to be fitted together, which can change the total length of the damp telescopic tube by a small tube slipped over a big tube telescopically. This can solve the questions of controlling handle feeling, quality instability and fricative bad voice between metallic tubes. The damp telescopic tube has at least two metallic tubes in different diameters. A small diameter tube is fitted in a big diameter tube in the two adjacent tubes. A limited location member is provided between the small diameter tube and the big diameter tube. A plastic piston is provided in the end of the small diameter tube which located inside of the big diameter tube and keeps in touch with the inside wall of the big diameter tube.

6 Claims, 4 Drawing Sheets

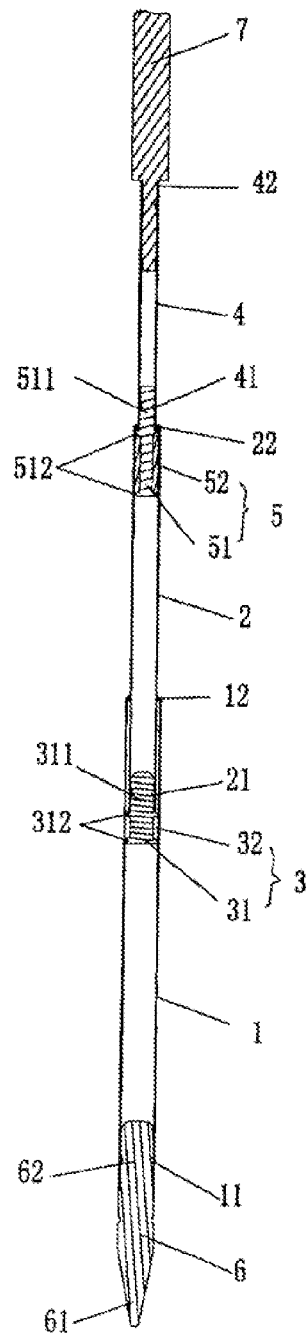
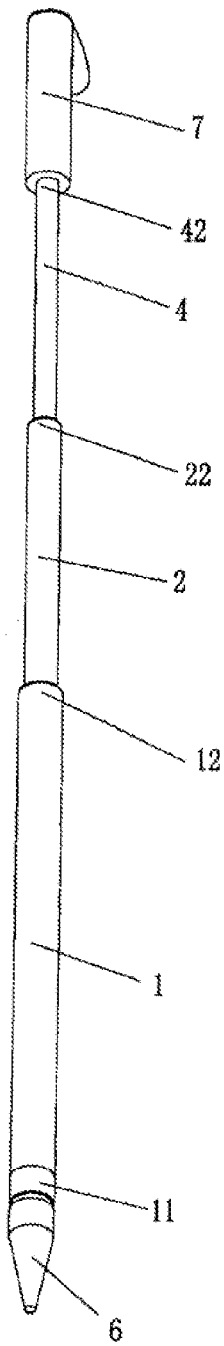
Fig. 1
Fig. 2

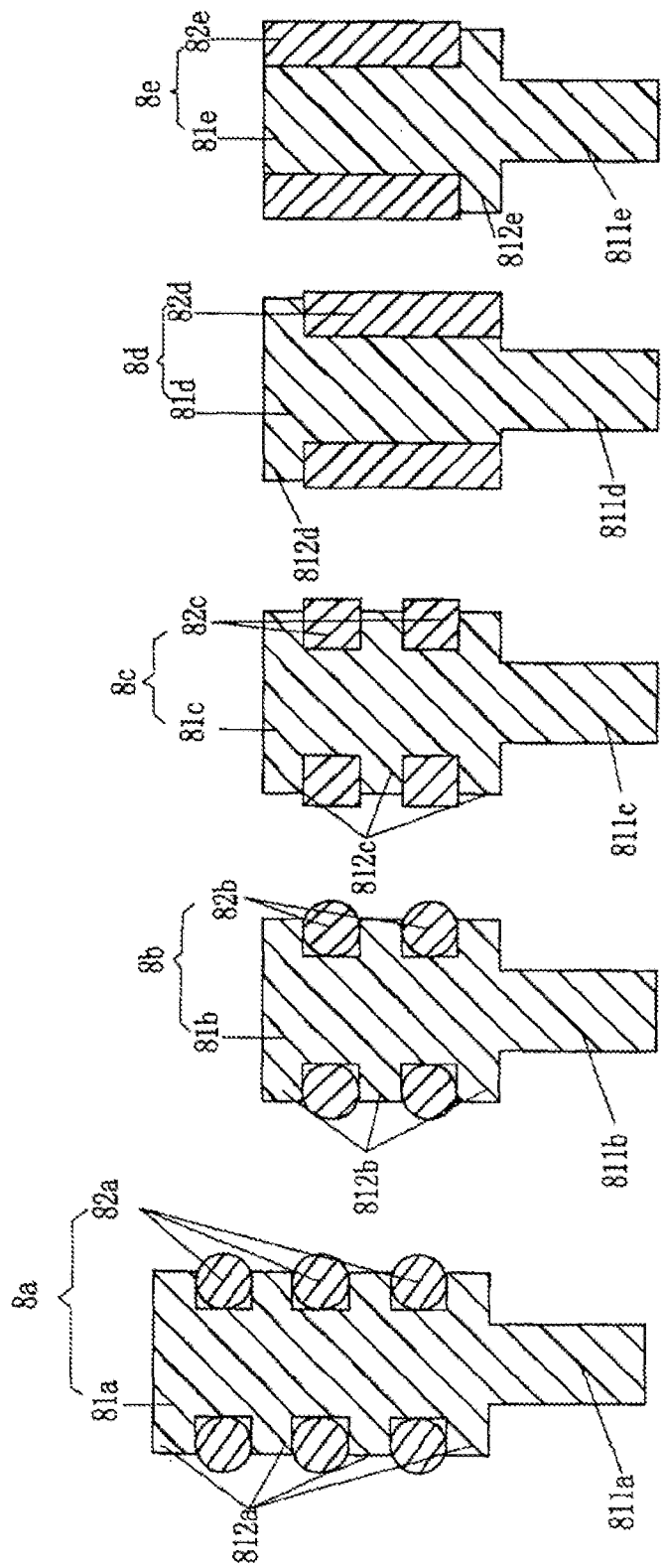

DAMP TELESCOPIC TUBE AND A DAMP WRITING PEN

BACKGROUND OF THE INVENTION

1. Field of the Invention

The present invention relates to a telescopic tube and a telescopic writing pen, and more particularly to one having at least two metallic tubes in different diameters to change its length after retraction.

2. Description of the Prior Art

A metallic telescopic tube is widely used to an antenna of an electronic apparatus, a writing pen for a touch screen or a pointer. A conventional metallic tube has at least two metallic tubes in different diameters which are a small tube and a big tube. The small tube is fitted in the big tube. A limit mechanism is provided between the small tube and the big tube. A leaf spring is provided between the outer wall of the small tube and the inner wall of the big tube. When in use, the small tube is pulled or pushed with respect to the big tube to shorten or prolong its length. The leaf spring provides a damping effect to the sliding of the small tube. The limit mechanism provides a limit effect to the extension or retraction of the small tube. Due to the differences in size between the tubes and the leaf spring, this kind telescopic tube has the following shortcomings:

1. When the small tube is pulled or pushed with respect to the big tube, it is not easy to control its looseness and tightness. The quality of the products is unstable.

2. When the small tube is pulled or pushed with respect to the big tube, there will be friction noises produced by the leaf spring and the tubes.

SUMMARY OF THE INVENTION

According to a first aspect of the present invention, there is provided a damp telescopic tube, having at least two metallic tubes in different diameters which are a small tube and a big tube, the small tube being fitted in the big tube, a limit mechanism being provided between the small tube and the big tube, the small tube having a first end inserted in the big tube, the first end of the small tube being provided with a piston to be in touch with an inner wall of the big tube.

Preferably, the piston comprises a piston shaft made of a rigid material and at least a piston ring made of elastic plastics or rubber, the piston ring being fitted on one end of the piston shaft, the piston ring having an outer surface to be in touch with the inner wall of the big tube, the piston shaft having another end inserted in and secured to the first end of the small tube.

Preferably, either of the piston ring and the piston shaft is formed with an exhaust notch.

Preferably, the piston shaft is in a 〒-like shape, the piston ring being disposed between two horizontal arms of the piston shaft.

Preferably, the limit mechanism is a reduced inner flange at a first end of the big tube, the first end of the big tube being adapted to receive the small tube, the inner flange being adapted to stop the piston provided on the first end of the small tube.

According to a second aspect of the present invention, there is provided a damp writing pen, comprising a pen head, a pen cap, and at least two metallic tubes in different diameters which are a small tube and a big tube, the small tube being fitted in the big tube, a limit mechanism being provided between the small tube and the big tube, the small tube having a first end inserted in the big tube, the first end of the small tube being provided with a piston to be in touch with an inner wall of the big tube.

The damp telescopic tube of the present invention uses the plastic piston to provide a damping effect for the sliding of the small tube, which has a good handle feeling, stability, and no fricative noise between metallic tubes. The piston comprises the piston shaft made of a rigid material and at least one piston ring made of elastic plastics or rubber, which is easy to be assembled. Either of the piston ring and the piston shaft is formed with the exhaust notch, prevent the small tube from rebounding automatically when the small tube is pulled or pushed with respect to the big tube. In particular, the piston shaft is in a 〒-like shape and the piston ring is disposed between the two horizontal arms of the piston shaft. This kind of piston may be produced by injection molding, which is stable in size and doesn't need more manpower for assembly. The automation level is high. This simplifies the assembled procedures, avoiding unstable quality due to manual procedures. The limit mechanism is the reduced inner flange at the first end of the big tube. The first end of the big tube is adapted to receive the small tube. The inner flange is adapted to stop the piston provided on the first end of the small tube. The limit mechanism is simple in structure and is convenient for production. Therefore, the damp telescopic tube has the advantages of good handle feeling, stability, and no fricative noises. The damp writing pen has a good effect in use.

BRIEF DESCRIPTION OF THE DRAWINGS

FIG. 1 is a cross-sectional view of a damp telescopic tube according to a first preferred embodiment of the present invention;

FIG. 2 is a perspective view of the damp telescopic tube in an extended status according to the first preferred embodiment of the present invention;

FIGS. 4a through 4e are cross-sectional views showing five pistons of the damp telescopic tube of the present invention;

DETAILED DESCRIPTION OF THE PREFERRED EMBODIMENTS

Figure 3:
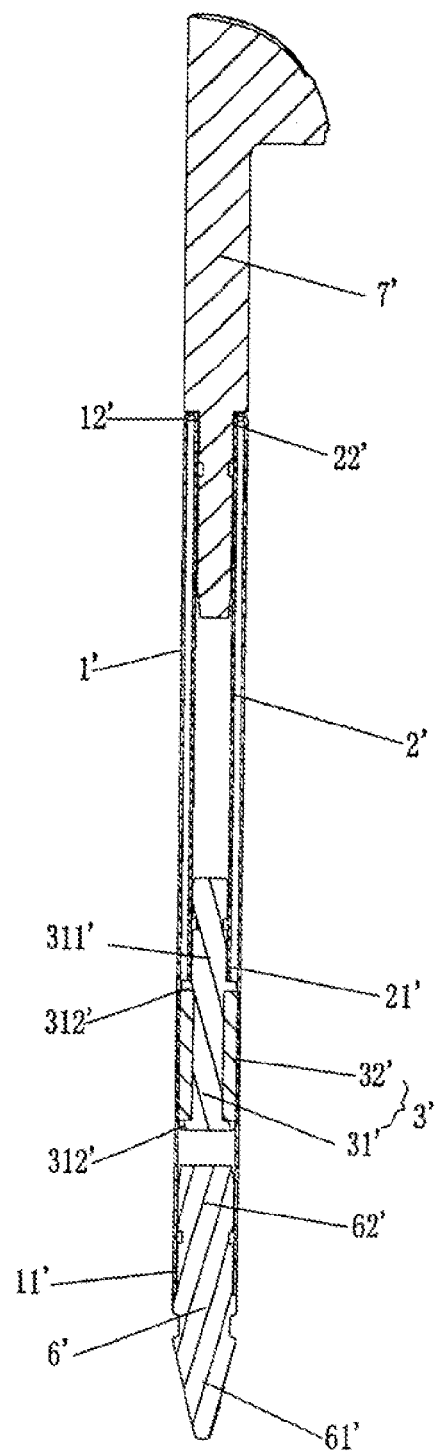
FIG. 3 is a cross-sectional view of a damp telescopic tube according to a second preferred embodiment of the present invention.

FIG. 1 is a cross-sectional view of a three-section writing pen for an electronic product screen according to a first preferred embodiment of the present invention, which comprises an outer tube 1 having a larger diameter, a middle tube 2 having a middle diameter, and an inner tube 4 having a smaller diameter. The three tubes are made of a metallic material.

The inner tube 4 having a lower end 41 provided with a first plastic piston 5. The first plastic piston 5 comprises a piston shaft 51 made of rigid plastics in a 〒-like shape and a piston ring 52 made of elastic plastics or rubber. The piston shaft 51 has a central shaft 511 inserted in and secured to the lower end 41 of the inner tube 4. The piston ring 52 is fitted between two horizontal arms 512 of the piston shaft 51.

The middle tube 2 has an upper end 22 formed with a reduced inner flange. The inner flange has an inner hole for sliding of the inner tube 4. The inner tube 4 is inserted in the middle tube 2, and the outer surface of the piston ring 52 at the lower end 41 of the inner tube 4 is in touch with the inner wall of the middle tube 2. The inner tube 4 has an upper end 42 inserted through the inner flange of the upper end 22 of the middle tube 2 and pulled upward. The middle tube 2 having a lower end 21 provided with a second plastic piston 3. The second plastic piston 3 comprises a piston shaft 31 made of rigid plastics in a 干-like shape and a piston ring 32 made of elastic plastics or rubber. The piston shaft 31 has a central shaft 311 inserted in and secured to the lower end 21 of the middle tube 2. The piston ring 32 is fitted between two horizontal arms 312 of the piston shaft 31.

The outer tube 1 has an upper end 12 formed with a reduced inner flange. The inner flange has an inner hole for sliding of the middle tube 2. The middle tube 2 with the inner tube 4 is inserted in the outer tube 1, and the outer surface of the piston ring 32 at the lower end 21 of the middle tube 2 is in touch with the inner wall of the outer tube 1. The upper end 42 of the inner tube 4 and the upper end 22 of the middle tube 2 are inserted through the inner flange of the upper end 12 of the outer tube 1 and pulled upward. The horizontal arms 312 of the piston shaft 31 are stopped by the inner flange of the upper end 12 of the outer tube 1.

A pen head 6 made of rigid plastics comprises a conical head portion 61 at a lower end thereof and an upper end 62 inserted in and secured to a lower end 11 of the outer tube 1.

A pen cap 7 made of rigid plastics in a stepped cylinder shape is provided. The pen cap 7 has a big end which has a diameter about equal to that of the outer tube 1 and larger than that of the middle tube 2 and a small end which has a diameter corresponding to the inner tube 4. The small end of the pen cap 7 is fitted in the upper end 42 of the inner tube 4.

FIG. 2 is a perspective view of the first embodiment of the present invention in a fully extended status. The conical head portion 61 of the pen head 6 is extended out of the lower end 11 of the outer tube 1. The lower end 21 of the middle tube 2 and the second plastic piston 3 are inserted in the outer tube 1. The inner flange of the upper end 12 of the outer tube 1 confines the middle tube 2 to be pulled to its extremity. The rest of the middle tube 2 is pulled upward from the upper end 12 of the outer tube 1. The lower end 41 of the inner tube 4 and the first plastic piston 5 are inserted in the middle tube 2. The inner flange of the upper end 22 of the middle outer 2 confines the inner tube 4 to be pulled to its extremity. The rest of the inner tube 4 is pulled upward from the upper end 22 of the middle tube 2. The small end of the pen cap 7 is fitted in the upper end 42 of the inner tube 4.

When the first preferred embodiment of the present invention is fully retracted, the pen cap 7 has a lower end surface engaging with the upper end 42 of the inner tube 4 and the upper end 12 of the outer tube 1; the lower end 41 of the inner tube 4 in the middle tube 2 and the first plastic piston 5 are slid in a lower section of the middle tube 2; and the lower end 21 of the middle tube 2 in the outer tube 1 and the second plastic piston 3 are slid in a lower section of the outer tube 1. After retraction, the total length the first preferred embodiment of the present invention in shortened to a half.

During the process of pulling and pushing the middle tube 2 and the inner tube 4, the first and second plastic pistons 3 and 5 provide a damping effect to the middle tube 2 and the inner tube 4, without friction noise. In addition, the elasticity of the first and second plastic pistons 3 and 5 neutralizes the differences in size among the outer tube 1, the middle tube 2 and the inner tube 4 to provide a smooth and stable pulling or pushing.

FIG. 3 is a cross-sectional view of a two-section writing pen for an electronic product screen according to a second preferred embodiment of the present invention, which comprises an outer tube 1' having a larger diameter and an inner tube 2' having a smaller diameter. The two tubes are made of a metallic material.

The inner tube 2' having a lower end 21' provided with a plastic piston 3'. The plastic piston 3' comprises a piston shaft 31' made of rigid plastics in a 干-like shape and a piston ring 32' made of elastic plastics or rubber. The piston shaft 31' has a central shaft 311' inserted in and secured to the lower end 21' of the inner tube 2'. The piston ring 32' is fitted between two horizontal arms 312' of the piston shaft 31'.

The outer tube 1' has an upper end 12' formed with a reduced inner flange. The inner flange has an inner hole for sliding of the inner tube 2'. The inner tube 2' is inserted in the outer tube 1', and the outer surface of the piston ring 32' at the lower end 21' of the inner 2' is in touch with the inner wall of the outer tube 1'. The upper end 22' of the inner tube 2' is inserted through the inner flange of the upper end 12' of the outer tube 1' and pulled upward. A pen cap 7' made of rigid plastics in a stepped cylinder shape is provided. The pen cap 7' has a big end which has a diameter about equal to that of the outer tube 1' and a small end which has a diameter corresponding to the inner tube 2'. The small end of the pen cap 7' is fitted in the upper end 22' of the inner tube 2'. The horizontal arms 312' of the piston shaft 31' are stopped by the inner flange of the upper end 12' of the outer tube 1'. A pen head 6' made of rigid plastics comprises a conical head portion 61' at a lower end thereof and an upper end 62' inserted in and secured to a lower end 11' of the outer tube 1'.

When the second preferred embodiment of the present invention is fully extend, the conical head portion 61' of the pen head 6' is extended out of the lower end 11' of the outer tube 1'. The lower end 21' of the inner tube 2' and the plastic piston 3' are inserted in the outer tube 1'. The inner flange of the upper end 12' of the outer tube 1' confines the inner tube 2' to be pulled to its extremity. The rest of the inner tube 2' is pulled upward from the upper end 12' of the outer tube 1'. The small end of the pen cap 7' is fitted in the upper end 22' of the inner tube 2'.

When the present invention is fully retracted, the pen cap 7' has a lower end surface engaging with the upper end 12' of the outer tube 1'; and the lower end 21' of the inner tube 2' in the outer tube 1' and the plastic piston 3' are slid in a lower section of the outer tube 1'. After retraction the total length of the second preferred embodiment of the present invention is shortened to two thirds.

During the process of pulling and pushing the inner tube 2', the plastic pistons 3' provides a damping effect to the inner tube 2', without friction noise. In addition, the elasticity of the plastic pistons 3' neutralizes the difference in size between the outer tube 1' and the inner tube 2' to provide a smooth and stable pulling or pushing.

The damp telescopic tube of the present invention may be made of rigid plastic material.

The piston in the damp telescopic tube of the present invention may use the structures as shown in FIGS. 4a through 4e.

As shown in FIG. 4a, a piston 8a comprises a piston shaft 81a made of copper, stainless steel, plastics or other rigid materials and three piston rings 82a made of elastic plastics or rubber. The piston shaft 81a has a short shaft 811a at a small diameter end thereof and four flanges 812a spaced with each other at a large diameter end thereof. The short shaft 811a is inserted in and secured to the end of the small tube which is inserted in the big tube. Three circular grooves are formed among the four flanges 812a. The three piston rings 82a are fitted in the three circular grooves at the large diameter end of the piston shaft 81*a*. Each of the three piston rings 82*a* has a portion exposed out of its adjacent flanges 812*a* to be in touch with the inner wall of the big tube.

As shown in FIG. 4*b*, a piston 8*b* comprises a piston shaft 81*b* made of a rigid material and two piston rings 82*b* made of an elastic material. The piston shaft 81*b* has a short shaft 811*b* at a small diameter end thereof and three flanges 812*b* spaced with each other at a large diameter end thereof. The short shaft 811*b* is inserted in and secured to the end of the small tube which is inserted in the big tube. Two circular grooves are formed among the three flanges 812*b*. The two piston rings 82*b* are fitted in the two circular grooves at the large diameter end of the piston shaft 81*b*. Each of the two piston rings 82*b* has a portion exposed out of its adjacent flanges 812*b* to be in touch with the inner wall of the big tube.

As shown in FIG. 4*c*, a piston 8*c* is substantially similar to the piston 8*b* with the exceptions described hereinafter. The piston 8*c* comprises a piston shaft 81*c* which is identical to the piston shaft 81*b* of FIG. 4*b* and two piston rings 82*c* each having a rectangular cross-section corresponding in shape to circular grooves formed among three flanges 812*c*.

As shown in FIG. 4*d*, a piston 8*d* comprises a piston shaft 81*d* made of a rigid material and a piston ring 82*d* made of an elastic material. The piston shaft 81*d* has a short shaft 811*d* at a small diameter end thereof and a flange 812*d* at the end of a large diameter end thereof. The short shaft 811*d* is inserted in and secured to the end of the small tube which is inserted in the big tube. The piston ring 82*d* is fitted onto the large diameter end and engages with the flange 812*d*. The piston ring 82*d* has a portion exposed out of the flange 812*d* to be in touch with the inner wall of the big tube.

As shown in FIG. 4*e*, a piston 8*e* comprises a piston shaft 81*e* made of a rigid material and a piston ring 82*e* made of an elastic material. The piston shaft 81*e* has a short shaft 811*e* at a small diameter end thereof and a flange 812*d* between the small diameter end and a large diameter end thereof. The short shaft 811*e* is inserted in and secured to the end of the small tube which is inserted in the big tube. The piston ring 82*e* is fitted onto the large diameter end and engages with the flange 812*e*. The piston ring 82*e* has a portion exposed out of the flange 812*e* to be in touch with the inner wall of the big tube.

Figure 5A:
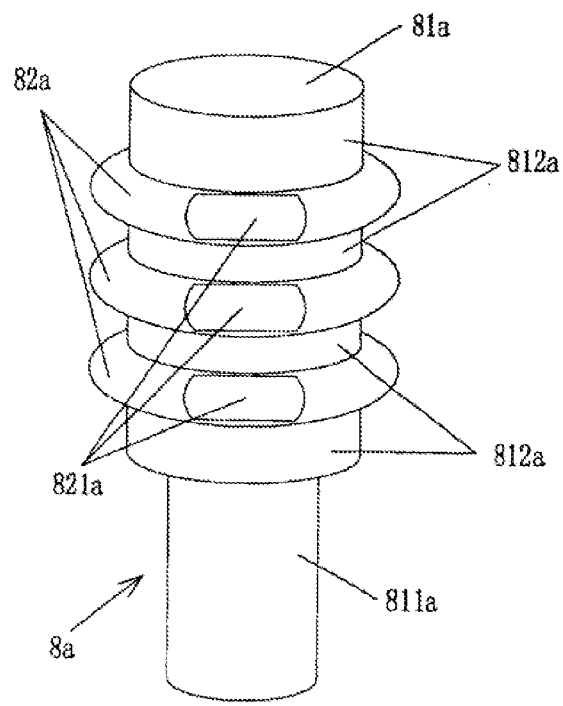
FIG. 5a is a perspective view of a piston formed with exhaust notches of the damp telescopic tube of the present invention.

In order to overcome the problems that the small tube will be automatically retracted due to vacuum suction when the small tube is pulled upward with respect to the big tube; and that the small tube will be automatically rebounded due to the pressure produced by the compressed air in the big tube when the small tube is pushed in the big tube, the piston rings are formed with exhaust notches, as shown in FIG. 5*a*, or the piston shaft is formed with exhaust notches.

As shown in FIG. 5*a*, a piston 8*a* comprises a piston shaft 81*a* made of copper, stainless steel, plastics or other rigid materials and three piston rings 82*a* made of elastic plastics or rubber. The piston shaft 81*a* has a short shaft 811*a* at a small diameter end thereof and four flanges 812*a* spaced with each other at a large diameter end thereof. The short shaft 811*a* is inserted in and secured to the end of the inner tube which is inserted in the big tube. Three circular grooves are formed among the four flanges 812*a*. The three piston rings 82*a* are fitted in the three circular grooves at the large diameter end of the piston shaft 81*a*. Each of the three piston rings 82*a* has a portion exposed out of its adjacent flanges 812*a* to be in touch with the inner wall of the big tube. Each of the three piston rings 82*a* is formed with an exhaust notch 821*a* thereon to form an air circulation passage with respect to the inner wall of the big tube, so that the inner tube will not be automatically retracted because there is no vacuum suction when the inner tube is pulled upward with respect to the big tube; and the inner tube will not be automatically rebounded because there is no compressed air in the big tube when the inner tube is pushed in the big tube.

Figure 5B:
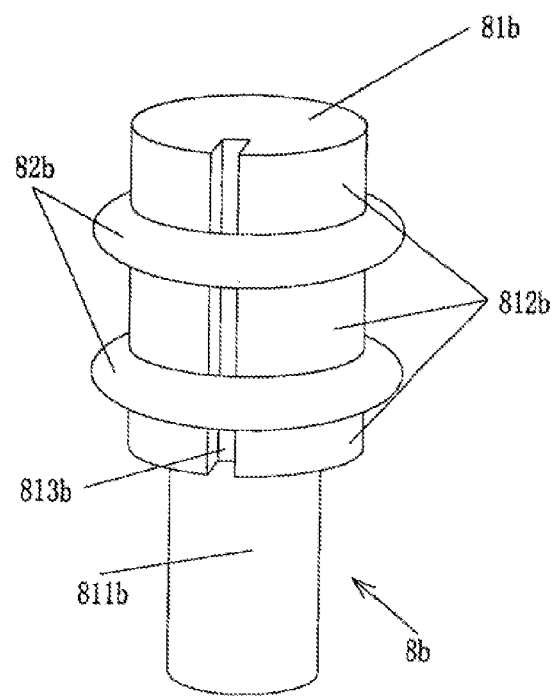
FIG. 5b is a perspective view of another piston formed with exhaust notches of the damp telescopic tube of the present invention.

As shown in FIG. 5*b*, a piston 8*b* comprises a piston shaft 81*b* made of a rigid material and two piston rings 82*b* made of an elastic material. The piston shaft 81*b* has a short shaft 811*b* at a small diameter end thereof and three flanges 812*b* spaced with each other at a large diameter end thereof. The short shaft 811*b* is inserted in and secured to the end of the inner tube which is inserted in the big tube. Two circular grooves are formed among the three flanges 812*b*. Each of the three flanges 812*b* is axially formed with an exhaust notch 813*b* thereon. The bottom of the exhaust notch 813*b* is lower than the bottoms of the two circular grooves. The two piston rings 82*b* are fitted in the two circular grooves at the large diameter end of the piston shaft 81*b*. The two piston rings 82*b* don't cover the exhaust notches 813*b* totally, which forms an air circulation passage. Each of the two piston rings 82*b* has a portion exposed out of its adjacent flanges 812*b* to be in touch with the inner wall of the big tube. With the air circulation passage of the piston shaft 81*b*, the inner tube will not be automatically retracted because there is no vacuum suction when the inner tube is pulled upward with respect to the outer tube; and the inner tube will not be automatically rebounded because there is no compressed air in the big tube when the inner tube is pushed in the big tube.

The damp telescopic tube of the present invention has at least two metallic tubes in different diameters. A small tube has one end provided with a plastic piston which is inserted in a big tube and in touch with the inner wall of the big tube. The structure is simple for manufacture. The damp telescopic tube of the present invention is used to a damp writing pen, which provides a good handle feeling, stability, and no fricative noise between metallic tubes.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A damp telescopic tube, having
   at least two metallic tubes in different diameters which are a small tube and a big tube, the small tube being fitted in the big tube,
   a limit mechanism being provided between the small tube and the big tube,
   the small tube having a first end inserted in the big tube, the first end of the small tube being provided with a piston to be in touch with an inner wall of the big tube
   wherein the piston comprises
      a piston shaft, including
         a short shaft at a smaller diameter end thereof, with the short shaft being inserted and secured to the small tube; and
         a plurality of flanges spaced with each other at a larger diameter end thereof; and
      one or more piston ring,
      the piston ring fits on one end of the piston shaft, the piston ring has an outer surface to be in touch with the inner wall of the big tube,
      the piston shaft has another end inserted in and secured to the first end of the small tube, and
      an exhaust notch is formed in one of two ways:
      i) the exhaust notch is formed axially on each of at least two flanges at the larger diameter end of the piston shaft; or
      ii) the exhaust notch is formed on each of the one or more piston ring, not being completely covered by the piston ring upon which the exhaust notch is formed.

2. The damp telescopic tube as claimed in claim 1, wherein the piston shaft is in a ╪-like shape, and the piston ring being disposed between two horizontal arms of the piston shaft.

3. The damp telescopic tube as claimed in claim 1 or 2, wherein the limit mechanism is a reduced inner flange at a first end of the big tube, the first end of the big tube being adapted to receive the small tube, and the inner flange being adapted to stop the piston provided on the first end of the small tube.

4. A damp writing pen, comprising a pen head, a pen cap, and at least two metallic tubes in different diameters which are a small tube and a big tube, the small tube being fitted in the big tube, a limit mechanism being provided between the small tube and the big tube, the small tube having a first end inserted in the big tube, the first end of the small tube being provided with a piston to be in touch with an inner wall of the big tube, wherein the piston comprises a piston shaft, including
a short shaft at a smaller diameter end thereof, with the short shat being inserted and secured to the small tube; and
a plurality of flanges spaced with each other at a larger diameter end thereof; and
at least a piston ring, the piston ring is fitted on one end of the piston shaft, the piston ring has an outer surface to be in touch with the inner wall of the big tube, the piston shaft has another end inserted in and secured to the first end of the small tube, and an exhaust notch is formed in one of two ways:
i) the exhaust notch is formed axially on each of at least two flanges at the larger diameter end of the piston shaft; or
ii) the exhaust notch is formed on each of the one or more piston ring, not being completely covered by the piston ring upon which the exhaust notch is formed.

5. The damp writing pen as claimed in claim 4, wherein the piston shaft is in a ╪-like shape, the piston ring being disposed between two horizontal arms of the piston shaft.

6. The damp writing pen as claimed in claim 4 or 5, wherein the limit mechanism is a reduced inner flange at a first end of the big tube, the first end of the big tube being adapted to receive the small tube, and the inner flange being adapted to stop the piston provided on the first end of the small tube.

\* \* \* \* \*